United States Patent [15] 3,680,094
Bayle et al. [45] July 25, 1972

[54] TERRAIN-WARNING RADAR SYSTEM

[72] Inventors: Guy P. Bayle, Orange; Douglas A. Johnson, Garden Grove, both of Calif.

[73] Assignee: North American Aviation, Inc.

[22] Filed: April 4, 1966

[21] Appl. No.: 540,053

[52] U.S. Cl. .............................. 343/7 TA, 343/5 R, 343/7 A
[51] Int. Cl. ........................................................... G01s 9/02
[58] Field of Search .......................... 343/5, 7, 7 TA, 5 R, 7 A

[56] References Cited

UNITED STATES PATENTS 3,243,802  3/1966  Carver .................................. 343/7 TA
3,397,397  8/1968  Barney ................................. 343/7 TA Primary Examiner—T. H. Tubbesing
Attorney—William R. Lane, L. Lee Humphries and Rolf M. Pitts

[57] ABSTRACT

In a directionally-ranging device adapted for airborne use as a terrain-following system, means for limiting or modifying the effective field of view of the system during a lateral or turning maneuver of a utilizing vehicle, to view that terrain about the predicted flight path associated with such maneuver. The azimuth direction angle of the directivity of the directionally-ranging device is varied from a forward direction toward the direction of the turn maneuver, while range-gating means blanks-out signals received from terrain lying in such maneuver direction and beyond the predicted flight path, whereby the utility of such terrain following system during lateral maneuvering is improved.

8 Claims, 7 Drawing Figures

TERRAIN-WARNING RADAR SYSTEM

The subject invention relates to radar systems adapted for airborne terrain-warning purposes, and more particularly to means for increasing the utility of such radar systems during lateral maneuvering of a vehicle utilizing such systems.

The present invention is an improvement on the terrain-following radar system described in the co-pending application, Ser. No. 332,996 for TERRAIN-FOLLOWING SYSTEM, filed Dec. 20, 1963 by J. O. Anderson et al., assignors to North American Aviation, Inc., assignee of the subject invention, now U.S. Pat. No. 3,396,391. The present invention has as one of its objects the improvement of the utility of the information provided by a radar system of the type described in the Anderson application by modifying the radar field of view thereof during lateral maneuvers of a utilizing vehicle in which such system may be installed.

As described in the above identified Anderson application, a terrain-following radar for a low-flying airborne vehicle is intended to provide terrain-warning information concerning terrain obstacles lying along the vehicle's flight path and above a selected vertical clearance reference relative to such flight path. These signals are used to indicate necessary pitch maneuvers for avoiding terrain obstacles in a low-flying mission. Conventionally, the vehicle's flight path is assumed to be along a straight line in a vertical plane containing the vehicle's FRL (fuselage forward reference line), which assumption is sufficiently accurate for straight and level flight of modern high-performance aircraft. Accordingly, the antenna of the terrain warning radar is maintained in an azimuth direction parallel to the FRL, or, in the case of an azimuthally scanning multi-mode radar system, the radar receiver output is coincidence gated at such azimuth direction and the gated receiver output employed by the terrain warning data processor of the radar system, as is well understood in the art.

As long as the utilizing vehicle is maintained in straight line (or a non-laterally maneuvering) flight condition, the terrain-warning information provided by the forward-looking terrain warning system is adequate for pitch maneuvering purposes. However, in a lateral maneuvering or turning situation, such terrain warning information concerning a flight path forward of the vehicle's immediate heading, is not relevant to the pitch maneuvering problem, because such terrain does not lie along the anticipated flight path of the laterally maneuvering vehicle.

By flying a low altitude military penetration mission by aid of a terrain-avoidance or terrain-following radar, the pilot of a military aircraft seeks to avoid detection. However, such vehicle may yet be intermittently exposed to probable detection upon "flying-up" to avoid sensed terrain obstacles. Accordingly, it may be desirable to laterally maneuver so as to fly between terrain prominences or down a valley in order to take advantage of the masking effect or concealment provided by such terrain features. During the performance of such lateral maneuvers, it is desirable for the terrain-following radar system to provide terrain-warning or pitch maneuvering signals for avoiding terrain obstacles along the predicted flight path associated with such lateral maneuver.

By means of the concept of the subject invention, an improved field of view is provided a terrain following radar system during lateral maneuvers of a utilizing vehicle.

In carrying out the invention in accordance with a preferred embodiment thereof, there is provided an elevation-scanned terrain following directionally ranging system. There is also provided means for varying the azimuth direction angle of the directivity of such directionally ranging system from a forward direction of a utilizing vehicle toward the direction of a turn maneuver, and range-gating means for blanking out received signals returning from terrain in such azimuth direction and beyond the intended flight path. In other words, the system is scanned in azimuth in the direction of the turn maneuver, and the system is concomitantly range-gated as a function of the scan angle and turning rate.

By means of the above-described arrangement, the effective field of view of the terrain following system is restricted or modified during a lateral or turning maneuver of the utilizing vehicle, to view that terrain about an intended or predicted flight path associated with such maneuver. In this way, the terrain warning signals developed by the terrain-following system may be confidently employed during a lateral maneuver for pitch maneuvering of a low-flying vehicle.

Accordingly, it is an object of the invention to provide an improved terrain-viewing radar system.

It is another object of the invention to provide a terrain viewing radar system having improved utility during lateral maneuvers of a utilizing vehicle.

It is a further object of the invention to provide means for restricting the field of view of a terrain following radar to that terrain about the predicted flight path of a laterally maneuvering vehicle.

It is still another object of the invention to vary the azimuth direction of a directional ranging sensor toward the direction of a turn maneuver.

Another object of the invention is to provide range gating means for blanking out received signals returned from terrain lying beyond the intended flight path.

These and other objects of the invention will become apparent from the following description, taken together with the accompanying drawings in which.

Figure 1:
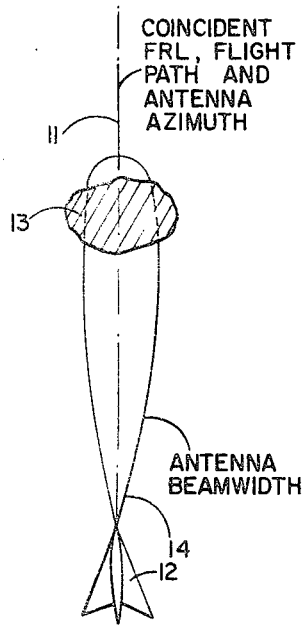
FIG. 1 is a plan view of the geometry of a terrain sensing situation with a utilizing vehicle in straight line flight.

Referring now to FIG. 1, there is illustrated a plan view of the geometry of a terrain sensing situation with a utilizing vehicle in straight line flight. The FRL 11 of the vehicle 12 is shown to be coincident with the projected flight path of the vehicle. The projected flight path is depicted as intercepting a terrain obstacle 13, lying within the beamwidth 14 of a terrain following radar system (installed on utilizing vehicle 12), the beam center of which beamwidth is coincident with FRL 11. Such radar system (not shown in FIG. 1) may be constructed and arranged, for example, in accordance with the description in the above described U.S. application, Ser. No. 332,996, filed by Anderson et al. Accordingly, the radar data concerning the existence of terrain obstacle 13 within the beamwidth 14 of such forward looking radar provides useful information with regard to the necessary pitch maneuvering of vehicle 12 in order to safely perform a low-altitude penetration mission while avoiding terrain obstacles along the straight line (laterally non-maneuvering) flight path 11 depicted in FIG. 1.

Figure 2:
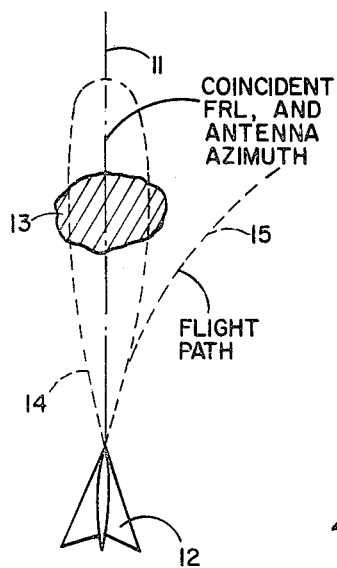
FIG. 2 is a plan view of the geometry of a terrain sensing situation for a prior-art terrain following radar employed on a laterally maneuvering vehicle.

Upon the indication of the sensed terrain obstacle 13 of FIG. 1, the vehicle 12 may be made to commence a lateral maneuver, as indicated in FIG. 2. Such lateral maneuver may be elected in order to avoid flying up and over the terrain obstacle 13 and thereby avoid exposing the vehicle to possible detection. Also, such lateral maneuver may enable the vehicle to fly between terrain prominences so as to employ the masking effect thereof. In a multi-mode radar having an azimuthally scanning antenna, for example, the mapping mode thereof will disclose the situation of terrain prominences which may be so employed, while the terrain-following mode thereof provides terrain warning signals for pitch maneuvering of the vehicle to avoid obstacles lying along a presumed flight path. However, if, upon the indication of a terrain obstacle along the flight path, the vehicle should be made to initiate a lateral or turning maneuver, as indicated by predicted flight path 15 in FIG. 2, then the FRL direction 11 along which the terrain obstacle is sensed by antenna beamwidth 14, no longer corresponds to the predicted flight path. Accordingly, the sensed terrain information so provided for the FRL direction is no longer relevant to the terrain following, or pitch maneuvering flight path, problem sought to be solved. Accordingly, it is necessary to turn the antenna toward the direction of the lateral maneuver, as shown more particularly in FIG. 3.

Figure 3:
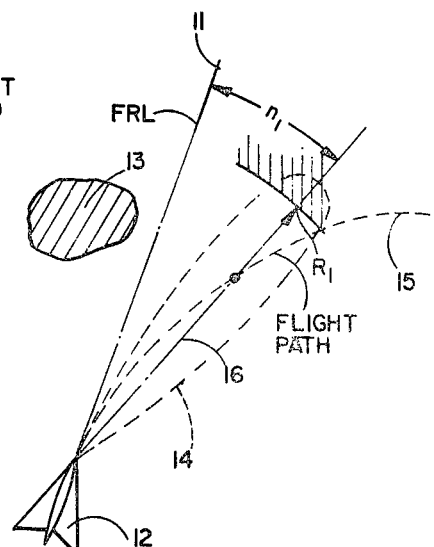
FIGS. 3 and 4 are plan views of the geometry of a terrain sensing, laterally maneuvering situation for a radar incorporating the concept of the subject invention.

Referring to FIG. 3, there is illustrated a plan view of the geometry of a terrain sensing situation for a vehicle control system utilizing the concept of the subject invention. As depicted in FIG. 3, vehicle 12 is engaged in a lateral or turning maneuver, as indicated by curved flight path 15, with the FRL of vehicle 12 indicated as straight line 11. The beamwidth 14 of the antenna of an on-board terrain sensing system, has been directed along the predicted immediate flight path 15 by turning the boresight axis 16 of such antenna toward flight path 15 through the illustrated horizontal projection of the angle $n$. The necessary extent of such azimuthal scan angle will be a function of the flight path turning rate or curvature of flight path 15 and the limited beamwidth of the antenna. Such curvature, in turn, will be a function of the vehicle forward velocity U and roll angle $\phi$ (in the case of roll or bank angle maneuvered vehicles). In other words, the greater the vehicle turning rate, the greater the azimuth angle by which the direction of the antenna directivity must be scanned.

Figure 4:
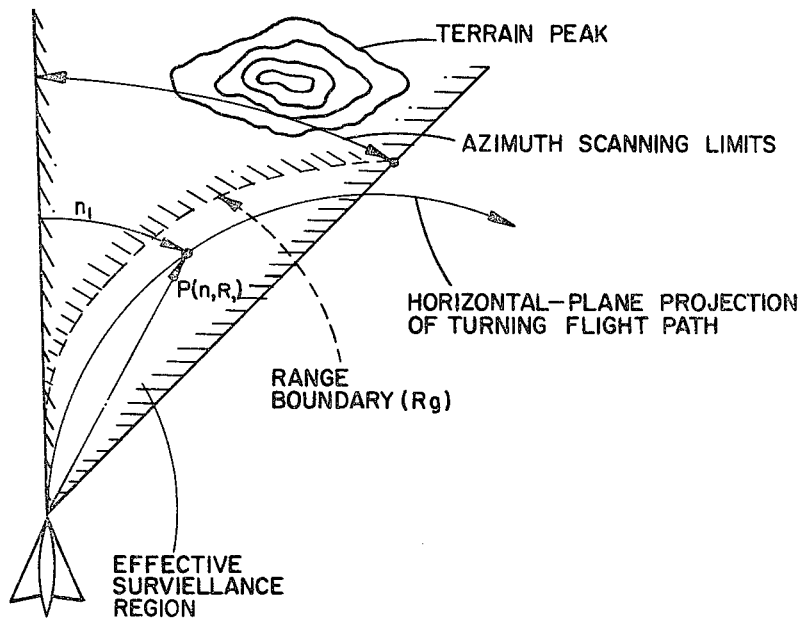

In addition to programming the sensing direction of the terrain following mode as a function of vehicle turning rate, it is further desirable to range-gate the terrain-following mode to blank-out as much of the antenna beamwidth 14 of the programmed antenna as corresponds to terrain regions beyond the predicted flight path lying within the antenna beamwidth in order to avoid causing the vehicle to fly-up in response to sensed terrain obstacles not lying along the flight path. In other words, the system is maximum range-gated (shown as $R_1$ in FIG. 3) as a function of the look-angle of the azimuthally scanning antenna and the predicted flight path geometry. In this way, the combined effect of the azimuth-scanning antenna beamwidth, and maximum range-gating (as a function of azimuth look angle) results in a limited radar surveillance sector which is limited about the predicted laterally maneuvering flight path, as shown more particularly in FIG. 4.

Figure 5:
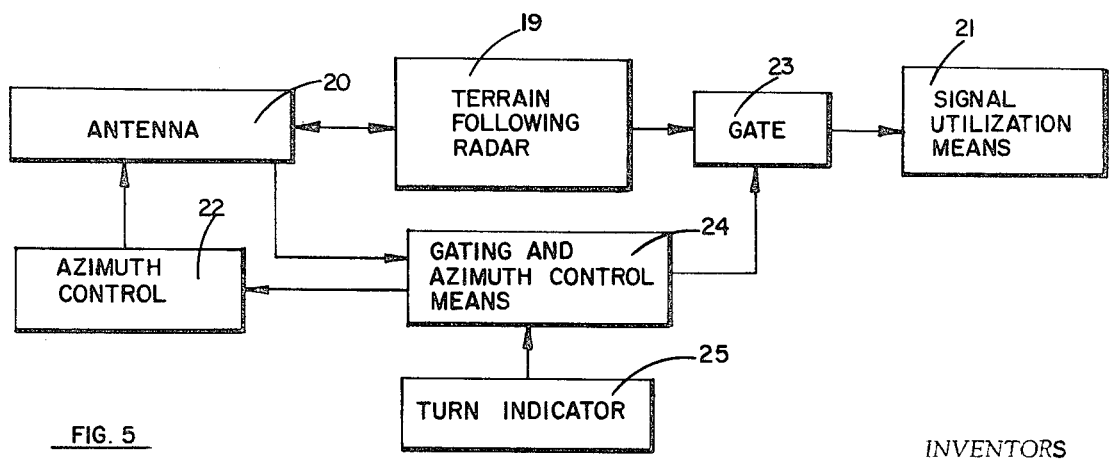
FIG. 5 is a block diagram of an exemplary system embodying the inventive concept.

A gated system for controlling the response of a directionally ranging sensor to a predicted flight path is shown in FIG. 5.

Referring now to FIG. 5, there is illustrated a block diagram of an exemplary system embodying the inventive concept. There is provided a terrain-following radar 19 having an antenna 20 and arranged for providing useful signals to signal utilization means 21 substantially in accordance with the arrangement of the above-described U.S. patent application Ser. No. 332,996 by J. A. Anderson et al. There is also provided azimuth control 22 for controlling antenna 20 in azimuth and gating means 23 interposed between the output of radar 19 and the input to utilization means 21. Gating means 23 and azimuth control 22 are controlled in response to control signals from gating and control means 24, which in turn is responsive to a turn indicator 25, such as a vertical gyro or like means for indicating the lateral maneuvering condition of a roll-maneuvering vehicle. The construction and arrangement of elements 22, 23 and 25 are well known to those skilled in the art, and are therefore shown in block form only for convenience in exposition. The arrangement of control means 24 will be more fully described hereinafter.

In normal cooperation of the arrangement of FIG. 5, control means 24 generates azimuth scanning control signals for operation of controller 22 in response to a lateral maneuvering condition indicated by indicator 25. Such direction control signals are also employed by control means 24 in the further generation of range gating signals for control of signal gate 23. In this way the scanning control of controller 22 and concomitant range gating of gate 23 cooperate to limit the effective radar surveillance of the gated output of radar 19 to that illustrated in FIG. 4, the range gate limit increasing with the azimuth look angle.

It has been found that optimum coverage of the predicted flight path is provided for by driving the antenna in azimuth (in the direction of the lateral maneuver) as a function of the elevation angular oriention to that look angle for which the associated range to the predicted flight path is equal to the horizontal component of the radar range to the ATF reference clearance surface, employed by ATE (automatic terrain following) radar 19 in generating pitch maneuvering signals (which reference is described more fully in the above described U.S. patent application, Ser. No. 332,996).

The expression for the range, $R_1$, from the vehicle to a point upon the predicted turning flight path lying at a selected look angle $\eta$ is:

$$R_1 = \frac{2U^2}{g|\tan \phi|} |\sin \eta| \qquad (1)$$

where:
$\phi$ = Vehicle bank angle
$U$ = Vehicle forward speed
$g$ = Gravitational constant The development of such expression is fully set forth in co-pending U.S. patent application, Ser. No. 432,791 filed Feb. 15, 1965 by D. E. Bennett et al., now U.S. Pat. No. 3,293,641.

By equating the expression of Equation (1) with the particular expression for the horizontal component of the slant range to the ATF clearance plane (mechanized in the ATF radar 19 of FIG. 5), and then solving for the antenna azimuth look angle, $\eta$, an expression is obtained for the amplitude of the desired azimuthal scanning of the antenna during a turn-maneuver. Such amplitude is determined as a function not only of the turning radius (or bank angle $\phi$ and forward velocity $U$), but also of the desired vertical clearance profile, which in turn is a function of the selected vertical clearance $h$, and the preselected vehicle vertical maneuver limits. Such azimuth scanning angle $\eta$ may be represented for roll angles beyond a threshold value $\phi_o$ as a straight function for a typical high performance aircraft as follows:

$$\mp |\eta| = [+K_1(\epsilon - \epsilon_o) + K_2|\phi| - K_3 U] \qquad (2)$$

and $\mathrm{sgn}\,\eta = \mathrm{sgn}\,\phi$ (3)

where $|\phi| > |\phi_o|$ $K_1 = 2.2$ degree per degree
$K_2 = 0.53$ degree per degree
$K_3 = 0.0067$ degree per foot per second
$\epsilon_o = 9.1$ degree
$\epsilon$ = antenna elevation angle
and $\eta = 0$ for $|\phi| < |\phi_o|$ (4)

Figure 6:
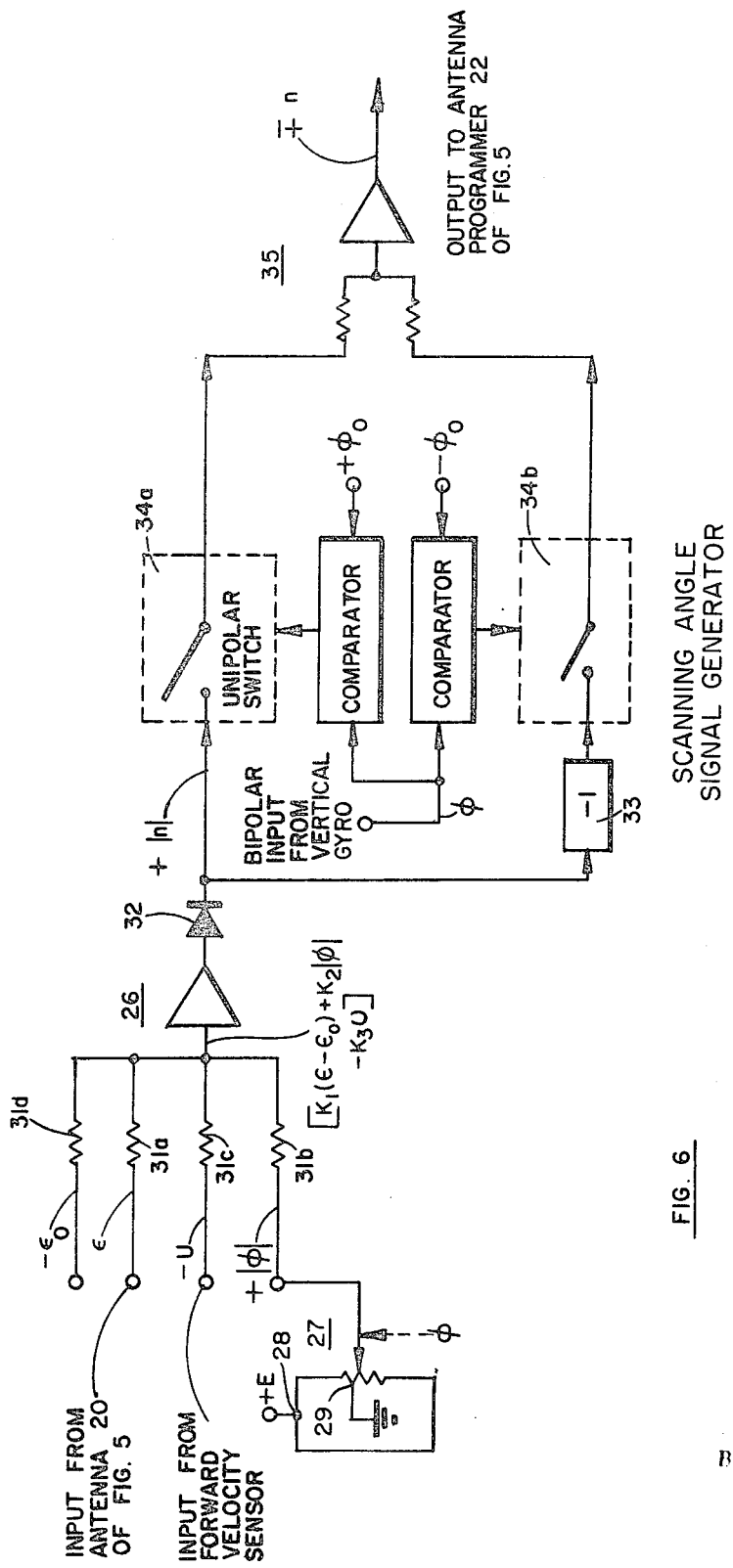
FIG. 6 is a schematic arrangement of the azimuth control signal apparatus of the gating and control means of FIG. 5.

A mechanization of the relationship of Equations (2), (3) and (4) is shown in FIG. 6.

Referring to FIG. 6, there is illustrated a preferred embodiment of the scanning angle signal generator function of control means 24 of FIG. 5, embodying a mechanization of Equations (2), (3) and (4).

There is provided a first signal summing means 26 for generating a signal indicative of the gain-weighted combination of antenna angle $\epsilon$, roll angle $\phi$, and vehicle velocity $U$. Signal combining means 26 may be an analog summing amplifier having a first, second and third input, respectively, coupled to an antenna pickoff, vertical gyro, and air speed indicator (not shown) for providing inputs of the preselected sense relationships of Equation (2), through suitable gain weighting input resistors 31a, 31b and 31c for providing respective ones of the gain factor $K_1$, $K_2$ and $K_3$ of Equation (2).

The unipolar roll angle signal, in response to bipolar roll angle, may be obtained by employing an even-valued function pickoff 27 on the roll axis of a vertical gyro, formed by tying the end terminals of a pickoff potentiometer together and connecting such common terminal 28 and the centertap terminal 29 thereof across a source of a fixed excitation potential. Alternatively, such even valued function may be generated by phase-inverting the bipolar roll signal from a d-c pickoff, and summing such oppositely poled unipolar outputs by means of like-poled unidirectionally conductive means such as a pair of like-poled diodes. The output of summing means 26 is unipolarly clipped by means of a clipping diode 32 and is then employed to generate a thresholded bipolar output signal. Such clipped or unipolar azimuth signal $|\eta|$ is phase inverted by phase inverting means 33 to provide a second unipolar azimuth signal $-|\eta|$ of opposite sense as the first. Each of the two unipolar azimuth signals are gated by means of signal gates or electronic switches 34a and 34b, and the gated outputs thereof combined by means of an output summing amplifier 35. The gate control input to each of gates 34a and 34b is arranged to gate on a mutually exclusive one of such gates, and more particularly gates on that one of gates 34a and 34b which has a signal input of like polarity as that of the roll angle $\phi$ during that interval for which the amplitude of the roll angle $\phi$ exceeds a threshold value, $\phi_o$. Gates 34a and 34b are unipolar gates, each responsive for example, to a control signal of mutually exclusive polarity. Such mutually exclusive polarity is provided by a bipolar roll-angle pickoff signal having a sense opposed to that of a selected threshold on bias $\mp|\phi_o|$ and a magnitude in excess of such bias, with which the roll signal is combined or summed. In other words, the output of amplifier 35 has an amplitude corresponding to that of the output of amplifier 26, and a sense corresponding to that of $\phi$ for magnitudes of $|\phi|$ in excess of a threshold value $|\phi_o|$.

The signal generated by the arrangement of FIG. 6 may be employed to control the reference direction of an azimuth gate or he amplitude and sense of an azimuth scan controller 22 (in FIG. 5) in the case of an antenna having a fixed elevation angle (such as in an off-boresight monopulse radar) or may, alternatively, azimuthally scan the antenna in synchronism with the elevation scanning (as in the case of an on boresight radar data processor). In such latter case, the angle signal, $\epsilon$, applied to the input of amplifier 26, will be a cyclically varying signal which will produce a cyclic variation or scanning of angle signal $|\eta|$, occurring at the output of amplifier 35.

Figure 7:
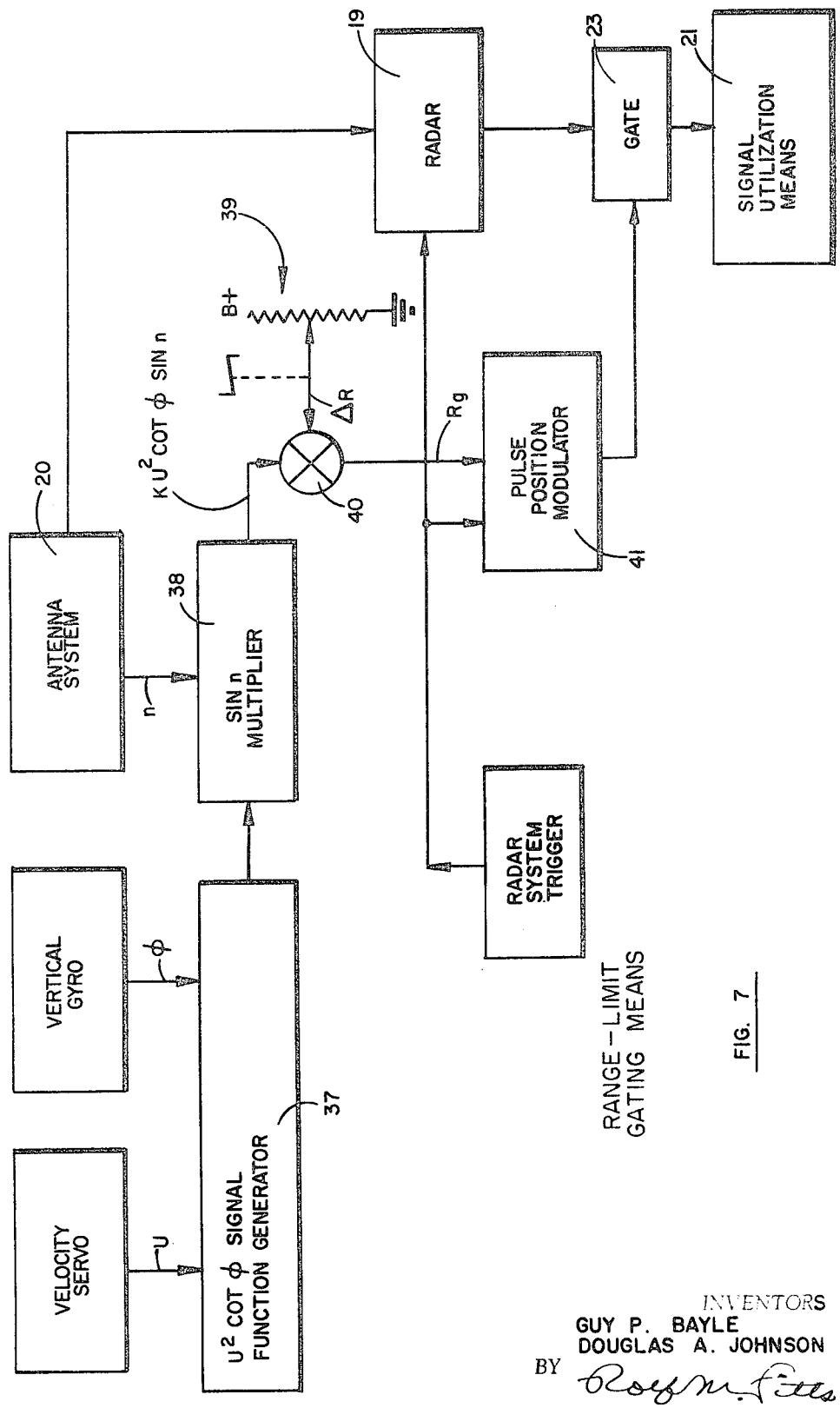
FIG. 7 is a schematic arrangement of the range gating apparatus of the gating and control means of FIG. 5.

In addition to providing azimuth scanning control of antenna 20 (in FIG. 5) during lateral maneuvering, the output of amplifier 35 is also employed in generating range-gating control signals for control of gate 23 (of FIG. 5), as shown more particularly in FIG. 7.

Referring now to FIG. 7, there is illustrated a preferred embodiment of the range limit gating function of control means 24 of FIG. 5, which embodiment is arranged for cooperation with the angle signal generator of FIG. 6. There is provided means for generating a range-gate control signal corresponding to a maximum range limit, which limit increases with increasing azimuth look angle $|\eta|$ and decreases with increasing vehicle turning rates. In other words, the magnitude of the range control signal $R_g$ increases with the function $$\frac{U^2}{g \tan \phi}$$

as well as increases with the angle $\eta$.

Such range gate function may be represented for roll angles beyond the threshold value $|\phi_o|$ as follows:

$$R_g = [R_{fp} \sin \eta + \sqrt{R_{fp}^2 \sin^2 \eta + 2R_{fp}R + R^2}] \quad (5)$$

where $R_{fp} = \dfrac{U^2}{g|\tan \phi|}$, the turning radius

Now, sgn $\eta$ = sgn $\phi$
Therefor: sgn sin$\eta$ = sgn tan $\phi$ and $R_{fp}|\sin \eta| = \dfrac{U^2 \sin \eta}{g \tan \phi}$, an even valued function.

Now a simpler function to mechanize than that of Equation (5) would be that of Equation (1), representing the polar coordinates $R_1$ and $\eta_1$ of the predicted curved flight path, plus an additional range increment $\Delta R$ for a safety margin:

$$R_g = R_1 + \Delta R \quad (7)$$

$$R_g = (2U^2/g)|\cot \phi \sin \eta| + \Delta R \quad (8)$$

where: $g$ = gravitational constant
and $\Delta R$ = a preselected constant

A mechanization of the first term of the right member of Equation (8) is provided by signal function generator 37 and multiplier 38 of FIG. 7, and is described and illustrated in greater particularity in the above noted U. S. patent application, Ser. No. 432,791.

Such range safety term $\Delta R$ is desired, in order to allow for possible variations in the predicted flight path due, for example, to vehicle sideslip or failure to perform a completely coordinated turn maneuver. The term $\Delta R$ may be provided by a bias signal source 39 and combined with the output of block element 38 by signal combining means 40. Such combined signal, corresponding to the function of Equation (8), may then be applied to a time modulator 41 or like means for generating a gating interval signal having a time interval analog of the voltage amplitude of the maximum range signal $R_g$. Such gating interval signal is then applied as a control input to the signal gate 23 of FIG. 5.

Accordingly, there has been described an analog mechanization for concomitantly scanning the antenna of an automatic terrain following radar toward the direction of the predicted flight path for a laterally maneuvering vehicle, and for maximum range gating the received radar signals as a function of the scanning direction of the antenna and the lateral maneuvering rate of the vehicle. Although the concept of the invention has been described in terms of a specific analog embodiment, the concept of the invention is not so limited, and other forms of analog mechanization may be employed. Further, although an analog form of mechanization has been employed in the illustrated embodiment, the concept of the invention is not so limited, and digital computing arrangements may be employed.

Therefore, novel means has been described for improving the performance of an automatic terrain following radar.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a range-gated, elevation-scanned terrain-following radar system, means for restricting the radar data coverage obtained during a lateral turning maneuver to that terrain about an intended or predicted flight path, comprising means for varying the azimuth angle of an antenna boresight direction of said radar system from a forward direction of a utilizing vehicle toward the direction of a turn maneuver, and range gating means for blanking out radar signals returning from terrain in the boresight direction and beyond the intended flight path.

2. The device of claim 1 in which said azimuth angle varying means comprises means for generating a signal indicative of the gain-weighted combination of antenna elevation angle $\epsilon$, roll angle $\phi$ and vehicle forward velocity $U$; and means for threshold gating said generated signal as a function of a preselected roll angle magnitude $|\phi_o|$.

3. The device of claim 2 in which said signal generating means comprises means for generating a unipolar signal indicative of the relationship:

$$|\eta| = [+K_1(\epsilon - \epsilon_o) + K_2|\phi| - K_3 U]$$

where
$K_1$ = 2.2 degree per degree
$K_2$ = 0.53 degree per degree
$K_3$ = 0.0067 degree per feet per second
$\epsilon_o$ = 9.1 degrees.

4. The device of claim 2 in which said threshold gating means comprises

Phase inverting means responsive to a unipolar output of said signal generating means for providing a unipolar signal of opposite polarity as said unipolar output; and First and second gating means responsive to said roll angle $\phi$ and a threshold roll angle magnitude $|\phi_o|$ for gating-on that one of said unipolar signal and unipolar output having a preselected sense relationship to said roll angle during that interval that said roll angle exceeds said threshold magnitude.

5. The device of claim 1 in which said first mentioned means comprises means for generating a control signal F$\eta$ having a preselected sense relationship to said roll angle $\phi$; and means for varying the magnitude $|\eta|$ of said control signal in accordance with the following gain weighted combination of antenna elevation angle $\epsilon$, roll angle $\phi$ and vehicle forward velocity $U$:

$$|\eta| = [+K_1(\epsilon - \epsilon_o) + K_2 |\phi| - K_3 U ]$$

where:
$K_1 = 2.2$ degree per degree
$K_2 = 0.53$ degree per degree
$K_3 = 0.0067$ degree per feet per second
$\epsilon_o = 9.1$ degrees 6. The device of claim 1 in which said range gating means comprises means responsive to said azimuth angle-varying means, the roll angle and forward speed of a utilizing vehicle for maximum range-gating the receiver output of said radar system.

7. The device of claim 6 in which said range-gating means comprises means responsive to vehicle roll angle and velocity for generating a first signal indicative of the ratio of the square of the vehicle velocity to the tangent of the roll angle;

means responsive to said azimuth-angle varying means and to said first signal for generating a gating control signal indicative of the product of said ratio signal and the sine of said varied azimuth direction; and signal-biasing means for selectively biasing said product signal for time-modulation control of a signal gate.

8. The device of claim 7 in which there is further provided a signal gate for gating a receiver of said radar system, and a time modulator for applying a gating control signal to a control input of said gate in response to a system trigger of said radar system, a control input of said modulator being responsive to said biased product signal for selectively delaying said gating control signal.

* * * * *